Nov. 10, 1931.    R. MEYER    1,831,505
FLUID TRANSMISSION MECHANISM
Filed Sept. 11, 1928    3 Sheets-Sheet 3

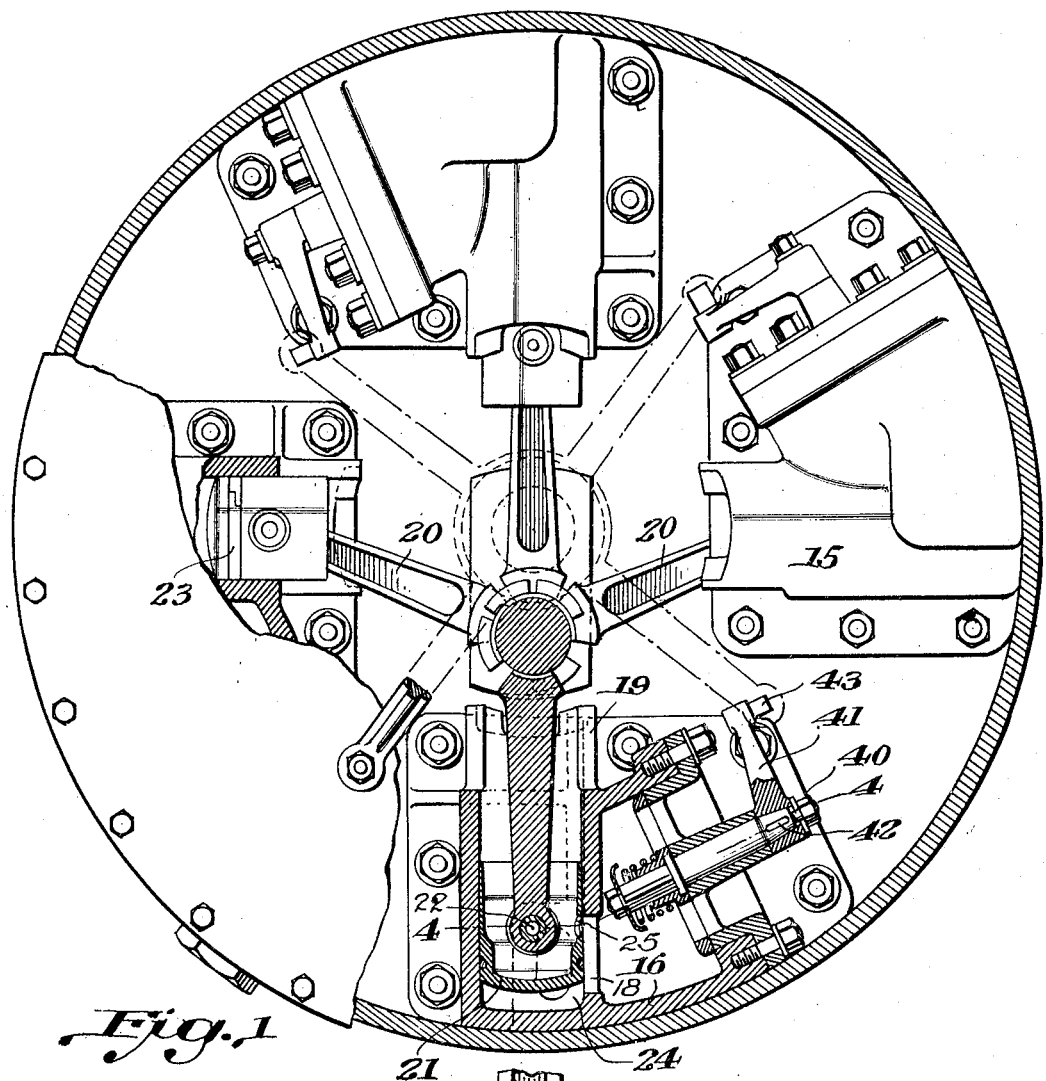
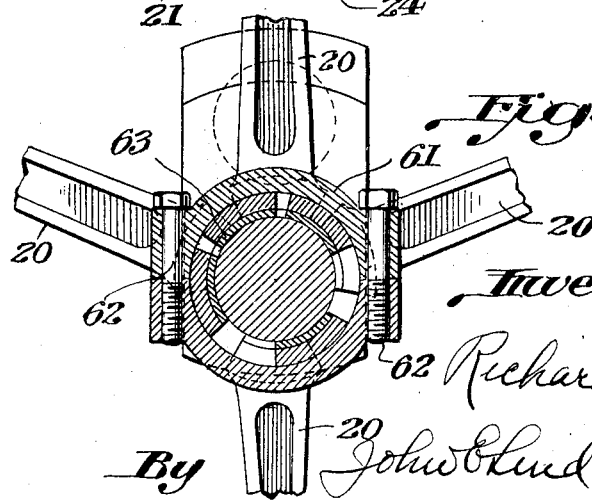

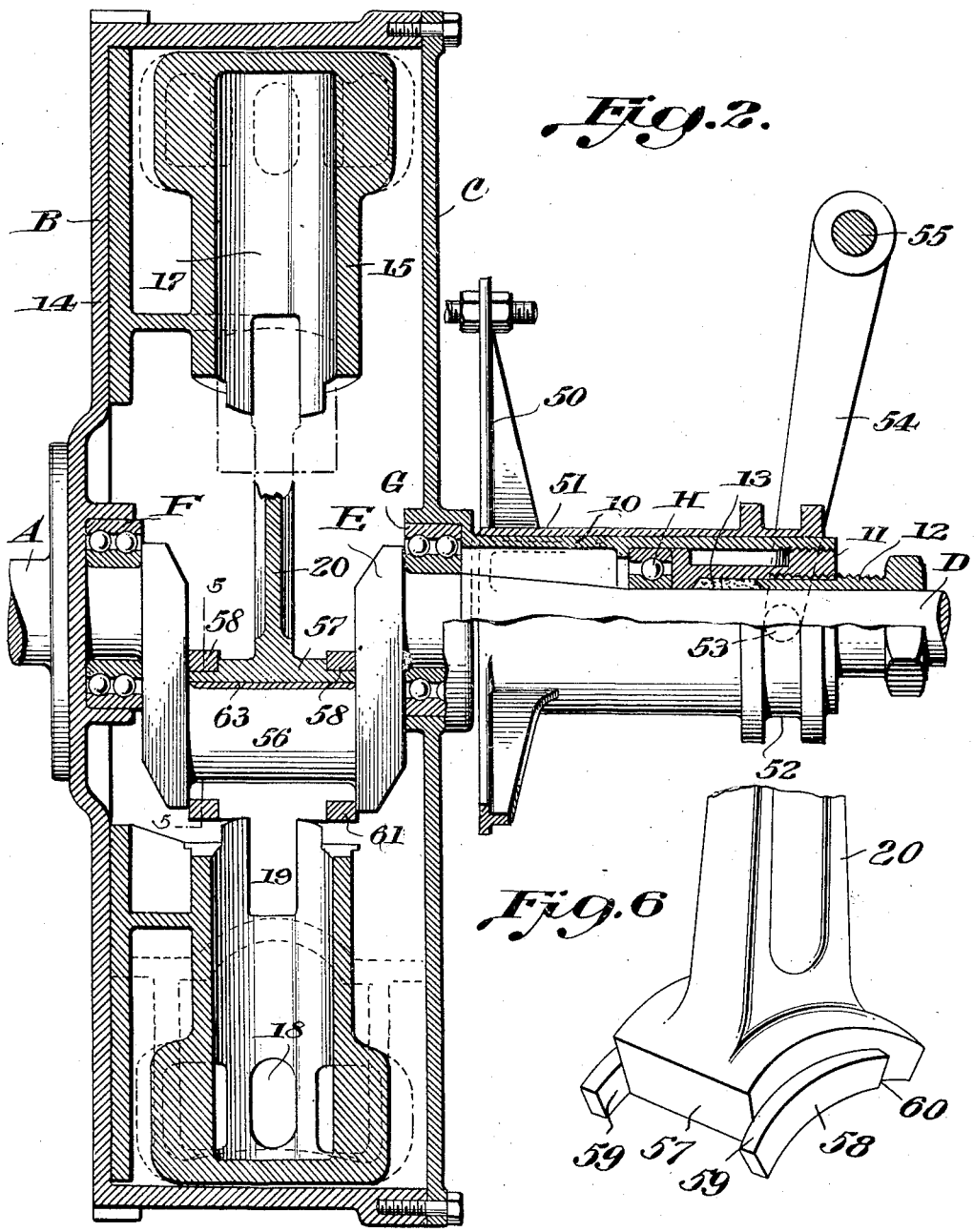

Inventor,
Richard Meyer
By John Blind  Atty.

Patented Nov. 10, 1931

1,831,505

UNITED STATES PATENT OFFICE

RICHARD MEYER, OF MARMORA, NEW JERSEY

FLUID TRANSMISSION MECHANISM

Application filed September 11, 1928. Serial No. 305,198.

This invention relates to transmission devices for automobiles, and has for its main object to provide a transmission means by which power may be transmitted from the power shaft of the automobile to the driving shaft and the speed of the driving shaft regulated from the lowest speed desired to that of the power shaft.

A further object of the invention is also to provide a transmission whereby any speed from a standstill to the highest speed of the engine may be imparted to the driving shaft in a uniform manner and without any jar or abruptness in passing from one speed to another.

Generally stated this invention consists of a plurality of cylinders having complementary pistons which are operable by a crank shaft retained in suitable bearings within a driving member or housing secured to the driven or engine shaft.

A still further object is to provide a novel form of valve in a construction of this type whereby any possibility of a vacuum being developed and an air pressure set up in the housing placing the entire structure under strain is eliminated.

With these and other objects in view as will hereinafter appear, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a part elevational and part cross sectional view taken transverse to the drive shaft of my device;

Figure 2 is a longitudinal sectional view with portions thereof shown in elevation;

Figure 5 is a cross sectional view taken through one of the rings upon the section line 5—5 of Figure 2 retaining the connecting rods upon the crank shaft; and Figure 6 is a partial perspective view of the end of one of the connecting arms adjacent the crank bearing;

In the drawings like reference characters refer to like parts.

Figure 3:
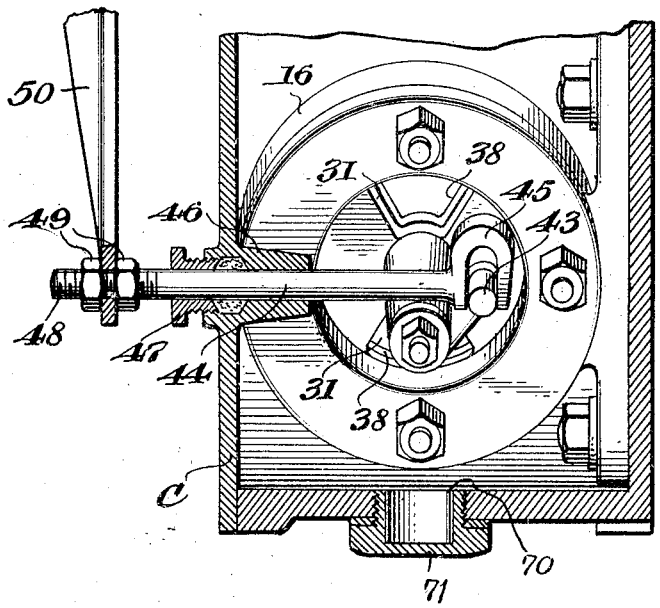
Figure 3 is a front view of the valve mechanism and the operating means therefor.

The mechanism consists in the following main parts: A indicates the drive shaft to which is secured the housing B having a cover plate C attached thereto and the driven shaft D. A crank E is formed integrally with the driven shaft D and is supported in the roller bearings F and G. In addition the driven shaft D is supported by the roller bearing H.

The cover member C has extending therefrom a trunnion member 10 in which a sleeve 11 is threaded and a bushing 12 is threaded within the sleeve 11 confining the packing 13 closely about the shaft D in order to make the entire mechanism oil or water tight.

Figure 4:
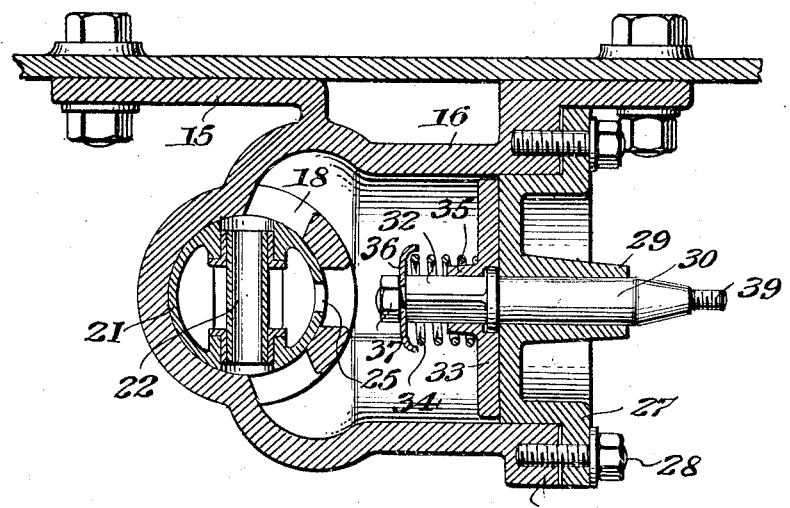
Figure 4 is a cross sectional view taken on the line 4—4 of Figure 1.

Secured to the wall 14 of the housing B and spaced equidistantly from each other are four cylinder blocks 15. These cylinder blocks also have cast integrally therewith the valve compartments 16 as shown more particularly in Figure 4. The cylinders 17 have enlarged outer portions with apertures 18 therethrough allowing easy passage for the oil or other incompressible fluid used. The inner portions of the cylinders 17 are also cut away as shown at 19 to allow free movement of the connecting arms 20 which are connected to the pistons 21 by means of the piston pins 22. The pistons are furnished with piston rings 23 of any desired form.

The piston 21 does not quite reach to the outermost part of the cylinder leaving a space 24 beyond the same whereby the fluid can be easily led under each piston and fill the entire cylinder upon the out stroke of such piston. In addition the piston is furnished with apertures 25 for allowing the oil to pass into the interior of the piston.

The peculiar construction of the valves whereby any possibility of a vacuum being created upon the out stroke of the piston eliminated will now be described. Referring to Figures 1 and 4 it will be noted that each valve housing 16 is cast integral with its respective cylinder block 15 and is of relatively wide diameter. The circular housing 16 is provided with a shoulder 26 to which is bolted the outside valve plate 27 by means of the bolts 28. The plate 27 is provided with an apertured boss 29 at the center thereof in which is rotatably mounted the valve operating rod 30. The plate 27 is also provided with apertures 31 as shown in Figure 3.

The valve operating rod terminates upon the inner end thereof in a squared shank portion 32 and slidably mounted upon this shank portion 32 is the plate 33 urged inwardly against the plate 27 by the spring 34. One end of the spring rests around a boss 35 formed upon the plate 33 while the other end of the spring 34 presses against a stop member 36 secured to the end of the squared portion 32 by the bolt 37. The plate 33 is provided with apertures 38 of the same configuration as the apertures 31 upon the plate 27. The result of this construction is that when the rod 30 is rotated the apertures 31 and 38 can be placed in alinement or can be placed out of alinement so as to shut off the passage of oil through the valve. Furthermore, upon oil being forced out of the cylinder by the piston and through the valve the plate 33 will be urged tightly against the plate 27 and the outflow of oil can be accurately controlled.

Upon the other hand the suction stroke of the piston and the creation of a suction will cause the plate 33 to slide along the stem 32 against the spring 34 and thereby open the oil passages in the valve as far as may be necessary so as to prevent any possibility of a vacuum occurring in the system. If a vacuum should occur in the system there would immediately be set up upon the compression stroke of the piston a high pressure of variable intensity due to the air throughout the entire system which would be highly deleterious to the proper working of the transmission. By this valve construction also the flow of oil is accurately controlled and since there is no possibility of a vacuum occurring therein the abrupt and jarring changes are positively eliminated in changing the speeds. If a vacuum should be created as is created in prior devices of this type immediately there is set up a jarring action which makes itself felt when changing speeds by the transmission. The valve above described positively eliminates any possibility of a vacuum occurring since there is the freest latitude allowed for the entrance of the oil directly behind the movement of the piston while at the same time controlling the flow of oil upon the compression stroke of the piston. By this construction one piston controls the entire transmission and the change of speed desired.

The valve operating rod 30 terminates in a threaded stem 39 which receives a nut 40 which locks the rod 41 to the operating rod 30. The rod 41 is preferably keyed to the rod 30 as shown at 42 in Figure 1. Upon the free end of the rod 41 a transversely disposed boss 43 is positioned as shown more clearly in Figure 3.

A reciprocating rod 44 has upon one end thereof a U-shaped element 45 which encloses the boss 43 and allows the bar 41 to be oscillated so as to open and close the valve. The cover C adjacent each valve is provided with an apertured boss 46 through which passes the rod 44 and a bushing and packing member 47 closes the passage in which the rod 44 reciprocates. Upon the threaded end 48 of the rod 44 and secured between two locking nuts 49 thereon is the operating rod 50 which is mounted upon a collar 51 in any suitable manner.

The collar 51 encircles the trunnion 10 upon the cover C and is slidable thereon. The collar 51 is provided with a channel 52 in which the pins 53 carried by the yoke shaped member 54 travel. The member 54 is pivoted at 55 and can be oscillated by any suitable means upon the automobile such as a foot pedal or a hand lever. On the oscillation of the member 54 the collar 51 will be moved along the trunnion 10 and the arms 50 will then reciprocate the rods 44 and thereby place the openings 31 and 38 upon the plates 27 and 33 into alinement or out of alinement and thereby control the passage of oil through the valve.

The connecting arms 20 are connected to the bearing member 56 of the crank E in a novel manner so as to provide the largest possible bearing surface while at the same time preventing any buckling between the arms 20 and the bearing member 56.

As shown more particularly in Figure 2 each arm 20 is provided with a transverse portion 57 and the ends of this transverse portion terminate in the cut down portions 58.

These cut down portions as shown more particularly in Figure 6 are of a peculiar construction and extend beyond one end of the portion 57 as shown at 59 while they are cut off at the other end as shown at 60. Securing the connecting arms to the bearing member 56 are ring members 61 shown more particularly in Figure 5. The ring members 61 are preferably divided in two and secured together by the bolts 62. The ring members fit over the shoulder portions 58 and by this construction it will be noted that the portions 59 of the elements 58 can overlap and partially encircle an adjacent element 57 upon an adjacent arm 20. This construction provides a much larger bearing surface for each arm 20 and prevents any possibility of buckling. The inner portion of the members 57 and the elements 58 are covered with bronze bearing metal 63.

The main feature throughout is the perfect control which is provided for the incompressible fluid which is placed throughout the entire housing B. By the construction above described the accurate control of the escape of the fluid is provided upon the up stroke of one or the other of the pistons. As a general rule only one of the pistons exercises a controlling effect upon the oil. In all the other cylinders the oil can freely enter behind the moving piston and thereby eliminate any vacuum with the consequent deleterious result.

The housing or casing B is provided with ports 70 closed by the plugs 71 whereby any leakage in the oil or other fluid may be easily replenished.

Some changes may be made in the construction and arrangement of the invention above set forth, without departing from the real purpose and spirit thereof, and it is the intention to cover by the following claims, any modified forms of structure or use of equivalents, which may be reasonably included within their scope.

I claim:

1. The combination of a driven shaft, a hollow fluid containing driving casing journaled on said shaft, a set of cylinders mounted upon said casing, a set of pistons cooperating with said cylinders and eccentrically mounted upon said shaft and means including a rotatable plate cooperating with each cylinder whereby a resistance is interposed to the circulation of the fluid in said casing only upon the outstroke of each piston.

2. The combination of a driven shaft, a hollow fluid containing driving casing journaled on said shaft, a set of cylinders mounted upon said casing, a set of pistons cooperating with said cylinders and eccentrically mounted upon said shaft and a set of rotatable plates cooperating with said cylinders and pistons to interpose a resistance to the circulation of the fluid in said casing only upon the outstroke of each piston.

3. The combination of a driven shaft, a hollow fluid containing driving casing journaled on said shaft, a set of cylinders mounted upon said casing, a set of pistons cooperating with said cylinders and eccentrically mounted upon said shaft and means including a slidable and rotatable plate preventing the creation of a vacuum with a consequent air pressure in said casing.

4. The combination of a driven shaft, a hollow fluid containing driving casing journaled on said shaft, a set of cylinders mounted upon said casing, a set of pistons cooperating with said cylinders and eccentrically mounted upon said shaft, a valve housing adjacent each of said cylinders, an apertured plate secured to said housing and a slidable and rotatable plate cooperating with said fixed plate.

5. The combination of a driven shaft, a hollow fluid containing driving casing journaled on said shaft, a set of cylinders mounted upon said casing, a set of pistons cooperating with said cylinders and eccentrically mounted upon said shaft, a valve housing adjacent each of said cylinders, an apertured plate secured to said housing and a spring pressed rotatable plate cooperating with said first mentioned plate.

RICHARD MEYER.